United States Patent [19]

Hosaka et al.

[11] Patent Number: 4,551,803

[45] Date of Patent: Nov. 5, 1985

[54] ELECTRONIC ENGINE CONTROL SYSTEM FOR CONTROLLING THE ENERGY CONVERSION PROCESS OF AN INTERNAL COMBUSTION ENGINE

[75] Inventors: Akio Hosaka; Akito Yamamoto, both of Yokohama; Katsunori Oshiage, Yokosuka, all of Japan

[73] Assignee: Nissan Motor Company, Limited, Yokohama, Japan

[21] Appl. No.: 398,554

[22] Filed: Jul. 15, 1982

[30] Foreign Application Priority Data

Jul. 17, 1981 [JP] Japan ............................... 56-110887

[51] Int. Cl.[4] ........................ F02B 3/00; G05B 15/02; F02D 37/00

[52] U.S. Cl. ............................... 364/431.05; 123/480; 123/486; 364/431.12

[58] Field of Search ....................... 364/431.05, 431.06, 364/424, 425, 200; 123/480, 486

[56] References Cited

U.S. PATENT DOCUMENTS

| | | | |
|---|---|---|---|
| 3,906,207 | 9/1975 | Rivere et al. | 364/425 |
| 4,140,087 | 2/1979 | Daumer et al. | 123/486 X |
| 4,143,622 | 3/1979 | Klötzner et al. | 123/486 |
| 4,181,944 | 1/1980 | Yamauchi et al. | 364/431.06 |
| 4,200,064 | 4/1980 | Engele | 123/480 X |
| 4,201,161 | 5/1980 | Sasayama et al. | 364/431.05 |
| 4,363,092 | 12/1982 | Abo et al. | 364/200 |
| 4,365,299 | 12/1982 | Kondo et al. | 364/431.06 |
| 4,366,541 | 12/1982 | Mouri et al. | 364/431.05 |
| 4,386,427 | 5/1983 | Hosaka | 364/431.11 X |
| 4,392,471 | 7/1983 | Miyagi et al. | 123/480 |
| 4,450,528 | 5/1984 | Yaegashi et al. | 364/431.05 |

FOREIGN PATENT DOCUMENTS 1393074 5/1975 United Kingdom .

OTHER PUBLICATIONS

Onboard Computer Provides Multifunction Service for Automobile Driver Computer Design, Feb. 1980, p. 114.

Automotive Electronics, "The BMW Bordcomputer, A Microcomputer System . . . ", R. Mueller and H. D. Fournell, pp. 43–47, (Oct.-Nov. 1979).

Automotive Electronics, "The Non-Volatile Memory as a Basis for Design . . . ", R. C. Ambrose, pp. 54–57, (Oct.-Nov. 1979).

*Primary Examiner*—Felix D. Gruber

*Attorney, Agent, or Firm*—Schwartz, Jeffery, Schwaab, Mack, Blumenthal & Evans

[57] ABSTRACT

An electronic engine control apparatus includes a digital computer which receives sensor signals indicative of various engine operating parameters and calculates corresponding settings of actuators used to control the energy conversion process of an internal combustion engine. The apparatus has a memory for storing and holding data independently of an ignition switch being turned off. The apparatus includes a data input for inputting data specifying a function to be performed, a memory location and a numeral. The computer is programmed to perform the function using the numeral and the memory location. The function to be performed may include modifying data in the memory location in accordance with the numeral.

3 Claims, 12 Drawing Figures

ELECTRONIC ENGINE CONTROL SYSTEM FOR CONTROLLING THE ENERGY CONVERSION PROCESS OF AN INTERNAL COMBUSTION ENGINE

BACKGROUND OF THE INVENTION

This invention relates to an apparatus for controlling the energy conversion process of an internal combustion engine and, more particularly, to such an apparatus utilizing a digital computer to process input sensor data and provide control signals to actuators in accordance therewith.

Electronic engine control systems are known that utilize a digital computer to receive input data indicative of engine operating parameters, calculate values corresponding to optimum settings of controlled variables such as fuel-injection timing, ignition timing, EGR-valve position, and the like, and provide control signals indicative of the calculated values to actuator means used to control the energy conversion process of an internal combustion engine. For such engine control systems, optimum settings for the controlled variables are different, for example, when the engine is idling than when the engine is operating normally.

In order to adjust a coefficient used in calculating a setting of the fuel control valve for controlling the quantity of fuel metered to the engine in the idle mode of operation, it is the conventional practice to employ a potentiometer electrically connected in a voltage divider circuit for supplying a voltage, the magnitude of which can be varied by rotating the potentiometer wiper shaft using a screwdriver. The voltage is applied to an A/D converter which converts it into a corresponding digital signal for application to the digital computer.

However, such coefficient adjustment employing one or more potentiometers having a potentiometer wiper mounted for sliding movement on a potentiometer resistor has several serious disadvantages. During vehicle operation, mechanical vibrations are transmitted to the potentiometers and cause defective contact between the potentiometer wiper and resistor, resulting in incorrect or unstable coefficient adjustment. Another disadvantage is that an attempt to increase the number of the coefficients to be handled requires an increased number of potentiometers, resulting in an expensive coefficient adjusting device. Furthermore, the number of the coefficients to be handled is limited due to the limitation on the number of the conversion channels of the A/D converter.

Therefore, the present invention provides a microprocessor-based electronic engine control apparatus employing an improved data adjusting device which is free from the above described disadvantages found in conventional devices.

SUMMARY OF THE INVENTION

There is provided, in accordance with the present invention, an apparatus for controlling the energy conversion process of an internal combustion engine having an ignition switch, sources for deriving signals indicative of engine operating parameters, and means for controlling the energy conversion process. The apparatus comprises a first control unit for deriving data, and a second control unit employing a digital computer having a memory for storing data therein. The memory holds holding the stored data independently of the ignition switch being turned off. The digital computer calculates settings of the means for controlling the energy conversion process using the signals from the sources and the data stored in the memory. The digital computer is responsive to the data from the first control unit for modifying the data stored in the memory.

Preferably, the first control unit is adapted to derive command signals each having data specifying a desired location and a desired numeral. The memory stores coefficients in respective locations. The digital computer responds to a command signal from the first control unit for correcting a coefficient stored in the memory at the location specified by the command signal. The digital computer corrects the specified coefficient for the numeral specified by the command signal.

BRIEF DESCRIPTION OF THE DRAWINGS

The details as well as other features and advantages of the present invention are set forth below and are shown in the accompanying drawings, in which.

DETAILED DESCRIPTION OF THE PREFERRED EMBODIMENTS

Figure 1:
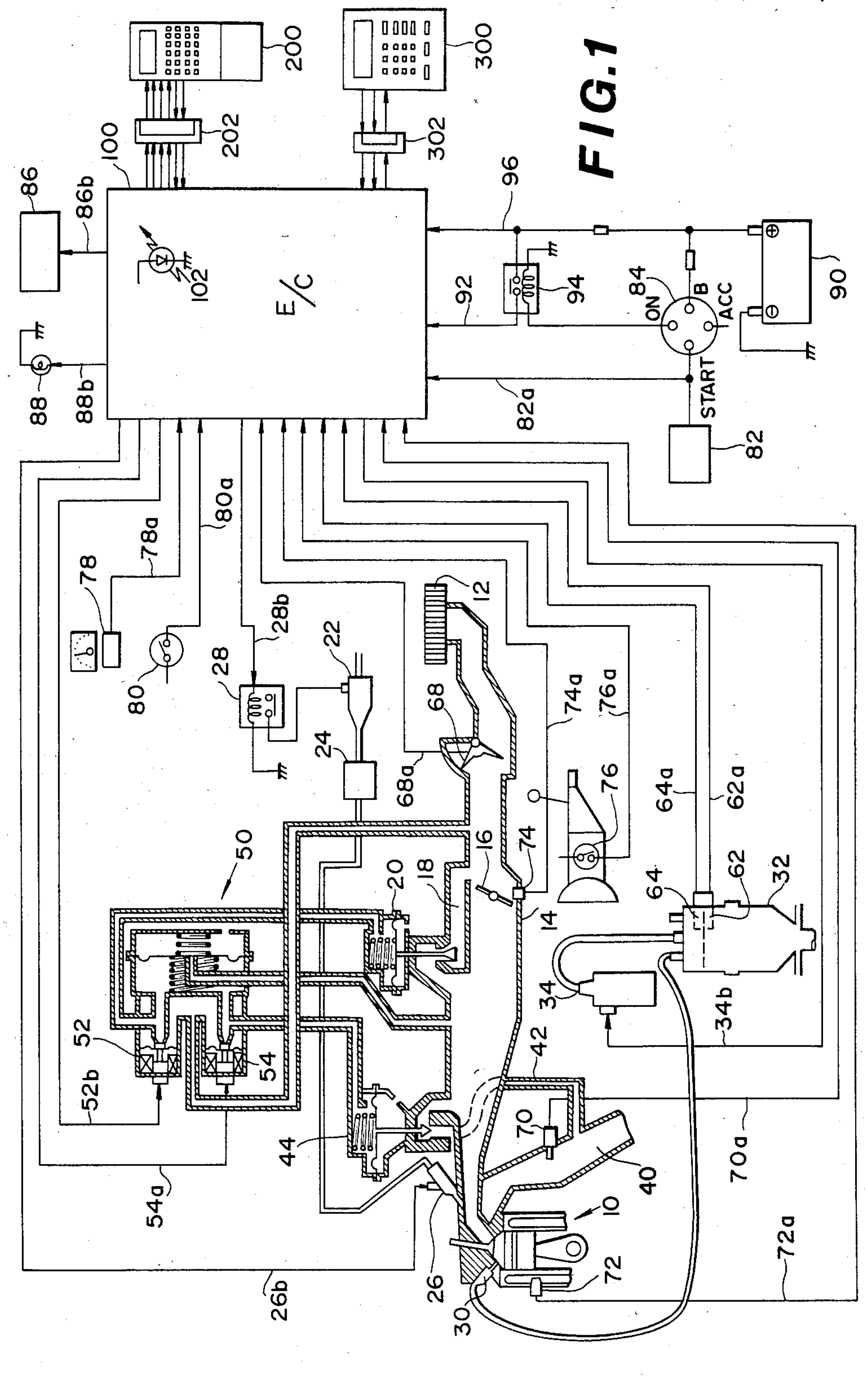
FIG. 1 is a block diagram showing one embodiment of a microprocessor-based electronic engine control apparatus made in accordance with the present invention.

Referring first to FIG. 1 of the drawings, there is illustrated one embodiment of a microprocessor-based electronic engine control system made in accordance with the present invention. Air to an internal combustion engine 10 is admitted through an air cleaner 12 into an intake passage 14 and is controlled by a throttle valve 16 situated within the intake passage 12. A bypass passage 18 opens into the intake passage 12 at different points upstream and downstream of the throttle valve 16. The bypass passage 18 has therein an ACC valve 20 for controlling the air flow through the bypass passage 18 so as to control the speed of rotation of the engine 10 when the engine is idling; e.g., when the throttle valve 16 is in its closed position. Fuel for the engine 10 is delivered by a fuel pump 22 from a fuel tank (not shown) through a fuel pressure regulator 24 to individual fuel injectors, only one of which is shown at 26, for each of the cylinders of the engine 10. The operation of the fuel pump 22 may be controlled in an on-off manner through a relay 28. The quantity of fuel injected into the individual cylinders of the engine is determined by the period of energization or operation of the injector 26. A spark plug 30 is mounted in the top of the cylinder for igniting the combustion ingredients within the cylinder when the spark plug 30 is energized by high voltage electrical energy from a distributor 32. The distributor 32 has a rotor connected to the secondary winding of an ignition coil 34. The distributor rotor is driven at one-half the rotation velocity of the engine crankshaft to sequentially contact distributor contacts to permit high voltage electrical energy to be supplied at appropriate intervals to the spark plugs of the engine. The engine also has an exhaust passage 40 for discharging exhaust gases to the atmosphere. A conduit 42 is provided for operatively connecting the exhaust passage 40 to the intake passage 14 for supplying exhaust gases back to the intake passage so as to reduce the generation and emission of pollutants. An exhaust gas recirculation (EGR) valve 44 is disposed in the conduit 42 for controlling or metering the EGR flow back to the intake passage 14. A pneumatic control device 50 is provided which utilizes negative pressure developed in the intake passage 14 for controlling the positions of the ACC and EGR valves 20 and 44.

In order to measure or sense various engine and vehicle operating parameters such as crankshaft position, the quantity of air supplied to the engine, engine coolant temperature, the oxygen content of the exhaust gases, engine idling status, vehicle speed, transmission gear position, and the like, various sensors or detectors 62–82 are positioned at various locations with respect to the engine and vehicle. The crankshaft position sensor 62 and the reference pulse generator 64 are drivingly associated with the distributor 32. The crankshaft position sensor 62 generates crankshaft position electrical pulses 62*a*, each corresponding to one degree of rotation of the engine crankshaft. The reference pulse generator 64 generates reference electrical pulses 64*a*, each corresponding to 120 degrees of rotation of the engine crankshaft or 60 degrees of rotation of the distributor rotor. The angular position of the engine crankshaft with respect to a reference position may be sensed by starting to count the crankshaft position electrical pulses 62*a* upon the occurrence of a reference electrical pulse 64*a*. The speed of rotation of the engine 10 may be sensed by measuring the repetition rate or period of the crankshaft position electrical pulses 62*a* or the reference electrical 64*a*.

The airflow sensor 68 is located within the intake passage 14 of the engine 10. The airflow sensor 68 responds to the air flow to the engine and generates an output signal 68*a* which is in inverse proportion to the sensed quantity Qa of air to the engine. The exhaust gas sensor 70, which may be a conventional zirconia type oxygen sensor, is located in the exhaust passage 40 of the engine 10. The exhaust gas sensor 70 monitors the oxygen content of the exhaust and generates an output signal 70*a* indicative of the air/fuel ratio at which the engine is operating. The engine temperature sensor 72 has a thermistor mounted in the engine cooling system and connected in an electrical circuit capable of producing a signal directly proportional to the engine coolant temperature. The throttle position sensor 74 includes a switch adapted to close when the throttle valve 16 is in its closed position and generated a signal 74*a* indicative of an engine idling or decelerating status.

The transmission position sensor 76 has a switch adapted to close when the transmission is in neutral and generates a signal 76*a* indicative of the transmission being in neutral. The vehicle speed sensor 78 generates an output pulse signal 78*a* of a repetition rate directly proportional to the speed of running of the automotive vehicle. The load operation sensor 80 is associated with a switch adapted to close when the load such as an air conditioner is connected to a source of power and generates a signal 80*a* indicative of the load being operating. The engine cranking sensor 82, which is associated with an ignition switch 84, generates a signal 82*a* indicative of the engine being cranking.

Signals indicative of these actual engine and vehicle operating parameters are supplied to a microprocessor-based main control unit (E/C) 100 which thereby continuously computes optimum settings for the controlled variables, that is, the variables which may be selectively adjusted or varied to control or determine the performance characteristic of the engine's energy conversion process. The controlled variables include (1) the fuel injection pulse-width which determines the period of energization of the injector 26 and hence the quantity of fuel injected into the engine and the timing thereof; (2) the spark ignition, including advance angle in crankshaft degrees of rotation, firing and spark ignition dwell (time duration that the spark coil is energized; (3) the positioning of the AAC valve 20 which determines the quantity of air flow through the bypass passage 18 during engine idling and hence the idling speed of the engine; (4) the positioning of the EGR valve 44 which determines the quantity of exhaust gases recirculated into the intake passage 14; and (5) the operation of the fuel pump 22. The main control unit 100 provides a control signal 26*b* to the injector 26, a control signal 34*b* to the ignition coil, a control signal 52*b* to a solenoid valve 52 of the pneumatic control device 50, a control signal 54*b* to a solenoid valve 54 of the pneumatic control device 50, and a control signal; 28*b* to the relay 28.

The main control unit 100 measures fuel consumption and indicates it on a fuel meter 86. The main control unit 100 also has a self-check function of checking the operation of the main control unit 100, indicating the results on an indicator 102, and turning on an electric light 88 to provide light indication of an abnormal condition. A checker 200 may be connected through a connector 202 to the main control unit 100 for checking the operation of the main control unit and indicating the results thereon.

The main control unit 100 is powered by a vehicle battery 90 through a main power line 92 and also through an auxiliary power line 96. The main power line 92 has therein a relay 94 which is conductive to connect the main control unit 100 to the vehicle battery 10 when the ignition switch 84 is in the ON position. The relay 94 is in its non-conductive state to open the main power line 92 when the engine is cranking. The auxiliary power line 96 remains connecting the main control unit 100 to the vehicle battery 90 even when the engine is cranking unless the vehicle battery 90 is removed for repair or recharge.

The main control unit 100 is also connected through a connector 302 to a microprocessor-based auxiliary control unit 300 which performs various functions to be described later in detail. The electronic engine control system of the present invention has two separate microprocessor-based control units for reasons as follows:

Engine control systems employing a single microcomputer which has circuit components in a sufficient number to provide a large capacity to perform a great number of functions, have demonstrated very poor reliability and high cost. The disadvantages attendant upon such engine coolant systems will be described further.

They require a great number of connection wires bundled in one or more harnesses and a connector having connection pins related to the number of the connection wires. The connection wires create undesirable great forces on the connector to deform it, causing unstable electrical connection between the connection wires and the microcomputer. In addition, signals on the connection wires interact to introduce noises into the signals, increasing the possibility of computer malfunction.

There is an increasing failure rate and a decreasing system reliability as the number of circuit components increases. A failure in one circuit component has an undesirable effect on other circuit components through a common circuit such as power circuit, causing the engine control system to perform no function. This may be avoided to some extent by sharing the required functions with two separate microcomputers.

With the circuit scale getting larger, the required number of connection pins increases and the size of the engine control system increases. This requires a larger volume of space for equipment and renders it more difficult to position the engine control system in an optimum location.

Microcomputers perform many tasks on a time sharing basis, each task being performed at longer intervals as the number of the tasks increases. If the interval gets longer than that determined by the required control speed, it should be done to share the required tasks with another microcomputer or to increase the data processing speed of the microcomputer. However, increasing the data processing speed increases costs or is impossible in some cases.

It is a matter of general knowledge that lower cost engine control systems may be obtained by using a single microcomputer to perform the required functions than by sharing the required functions with separate microcomputers. As the number of the required functions exceeds a limit, however, many technological difficulties arise in using a single microcomputer to perform the required functions and special techniques are required to manufacture circuit components such as IC, LSI, and the like, resulting in extremely high cost engine control systems.

Figure 2:
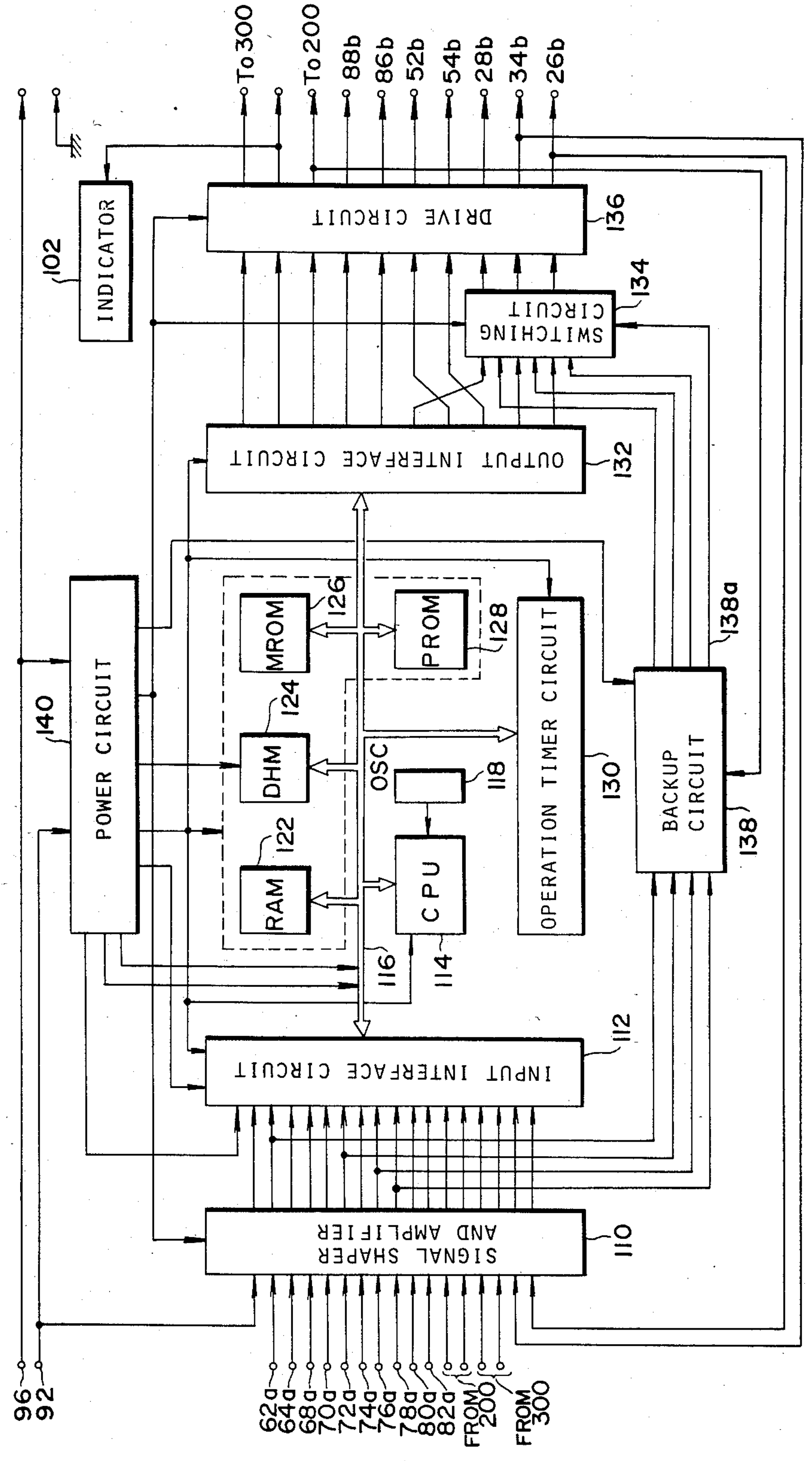
FIG. 2 is a functional block diagram showing a detailed structure of the main control unit used in the engine control apparatus of FIG. 1.

Referring to FIG. 2, the main control unit 100 includes a signal shaper and amplifier 110 which receives the battery potential indicative signal 90*a* from the main power line 92 and the sensor signals 62*a*–82*a* from the sensors 62–82 positioned in various locations of the engine and vehicle. The signal shaper and amplifier 110 also receives the check command signals from the checker 200 and the data input signals from the auxiliary control unit 300. The signal shaper and amplifier 110 amplifies and shapes the input signals for application to an input interface circuit 112. An additional function of the signal shaper and amplifier 110 is to absorb surge and remove noises from the input signals so as to assure that the main control unit 100 is maintained free of failures and malfunctions.

The input interface circuit 112 includes an analog-to-digital converter and registers. The A/D converter begins, on command from a microprocessor system, to sequentially convert the analog input signals from the signal shaper and amplifier 110 into binary words. The binary words indicative of the actual sensed engine and vehicle parameters are stored in the respective registers. The input interface circuit 112 further includes means for processing crankshaft position signals and switch signals.

The microprocessor system includes a central processor unit (CPU) 114, a memory section 120, and an operation timer 130, all of which communicate with each other through a data bus 116. The memory section 120 includes a read/write memory (RAM) 122, a data holding memory (DHM) 124, a mask read only memory (MROM) 126, and a programmable read only memory (PROM) 128. The RAM 122 temporarily stores data obtained in the course of data processing and resulting from the data processing. The data stored in the RAM 122 cannot be held when the ignition switch 84 is turned off to open the main power line 92. The DHM 124 stores data obtained in the course of data processing and resulting from the data processing. The data stored in the DHM 124, which is powered through the auxiliary power line 96, can be held even when the ignition switch 84 is turned off. The MROM 126 contains permanent programs for implementing the various control laws, interrupt handling routines, etc. and further contains permanent appropriate engine control data required for the CPU 114 to implement the programs. The permanent programs and data have been stored in the MROM 126 during the MROM being manufactured. The PROM 128 contains permanent programs and data which are similar to those stored in the MROM 126 and which may vary according to the characteristics of the individual type of vehicle and its engine. The permanent programs and data have been stored in the PROM 128 before it is assembled into the microprocessor system.

The CPU 114 receives inputs from a crystal controlled clock oscillator 118 and generates the required timing signals for the remainder of the system. The CPU 14 executes the programs stored in the MROM 126 and the PROM 128 for reading engine and vehicle parameter data out of the input interface circuit registers, processing the data to obtain optimum values of settings for controlled variables, and outputting digital control words indicative of the optimum settings for the controlled variables into registers of an output interface circuit 132.

The operation timer circuit 130 is effective to augument the operation capacity of the CPU 114. The operation timer circuit includes a multiplier serving to increase the data processing rate of the CPU 114, an interval timer producing interrupt signals to the CPU at constant time intervals, and a free running counter providing information on the time at which an event occurs and the lapse timer between successive event occurrences.

The output interface circuit 132 receives the binary words indicative of (1) the required timing and pulse-width of the fuel injection pulses, (2) the ignition firing delay from the last crankshaft position pulse and ignition pulse-width information, (3) the idle speed control function, (4) the EGR control function, and (5) the fuel pump control function, and converts these digital words into pulse widths capable of driving or actuating a drive circuit 136. The drive circuit 136 is a power amplifier which responds to the pulse-width inputs and supplies control signals to operate the fuel injector 26, the fuel pump relay 28, the ignition coil 34, the ACC valve actuator 52, the EGR valve actuator 54, and the like. The drive circuit 136 also supplies data signals through the connector 202 to the checker 200 and through the connector 302 to the auxiliary control unit 300. The drive circuit 136 receives a part of the output signals from the output interface circuit 132 through a switching circuit 134.

The main control unit 100 also includes a back-up circuit 138 which connects a part of the output signals from the signal shaper and amplifier 110 to the switching circuit 134. The back-up circuit 138 monitors one or more signals from the drive circuit 136 and detects any trouble in the microprocessor system components such as the memory section. If any trouble occurs in the microprocessor, the back-up circuit 138 will generate a command signal 138*a* to the switching circuit 134 which thereby blocks the signals from the output interface circuit 132 and instead passes the signal from the back-up circuit 138 so as to permit the drive circuit 136 to generate control signals required for the engine to operate.

The reference numeral 140 designates a power circuit which is connected to the main power line 92 for supplying a 5-volt constant voltage to the input interface circuit 112, the CPU 114, the memory section 120, the output interface circuit 132, and the back-up circuit 138, an on-off signal indicative of the ignition switch 84 being on or off to the input interface circuit 112, reset and halt signals to the CPU 114, a 8-volt constant voltage to the A/D converter of the input interface circuit 112, and a constant voltage to the signal shaper and amplifier 110, the switching circuit 134, and the drive circuit 136. The power circuit 140 is also connected to the auxiliary power line 96 for supplying a 5-volt constant voltage to the DHM 124.

Figure 3:
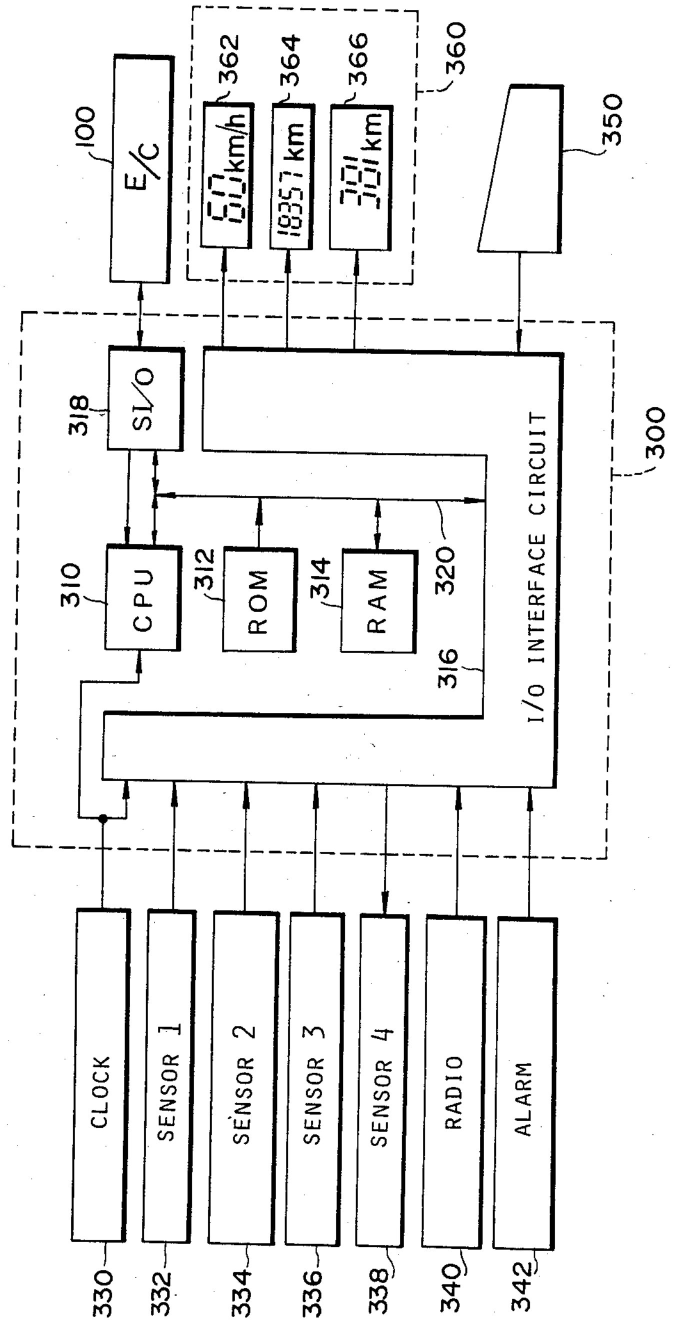
FIG. 3 is a functional block diagram showing a detailed structure of the auxiliary control unit used in the engine control apparatus of FIG. 1.

Referring to FIG. 3, the auxiliary control unit 300 includes a CPU 310, a ROM 312, a RAM 314, and input/output interface circuit 316, and an I/O circuit 318. The CPU 310 communicates with the rest of the system through a data bus 320. The I/O circuit 318 is connected to the main control unit 100 through the connector 302. The data transferring system between the main and auxiliary control units 100 and 300 may be a full-duplex, asychronous, serial communication interface HD6801SO. The input/output interface circuit 316 receives sensor signals from various sensors positioned at various locations with respect to the engine and vehicle. The sensors include a clock 330, a travel distance sensor 332, a fuel comsumption sensor 334, a residual fuel sensor 336, and an engine rotation sensor 338. The clock 330 generates a serial signal indicative of the time. The output of the clock 330 is also used as interrupt signals. The travel distance sensor 332 generates a pulse each time the vehicle travels a predetermined distance. The travel distance sensor may be a magnetic pickup transducer having a magnet mounted for rotation at a velocity proportional to the velocity of rotation of the propeller shaft. The fuel consumption sensor 334 generates a pulse each time a predetermined quantity of fuel is consumed. The residual fuel sensor 336 may be a conventional fuel gauge. The engine rotation sensor 338 may be the crankshaft position sensor used in the main control unit. The input/output interface circuit 316 also receives command signals from a keyboard input device 350. The input/output interface circuit 316 is connected to a radio receiver actuator 340, an alarm buzzer 342, and a digital indicator 360. The radio receiver actuator 340 turns on the radio receiver power switch and selects one of radio channels when receiving a control signal from the auxiliary control unit 300. The alarm buzzer 342 sounds in response to a control signal from the auxiliary control unit 300. The digital indicator 360 includes digital display devices 362, 364, and 366. The digital display device 362 is of a dynamic drive type employing 7-segment digit indicator tubes to exclusively show, on three figures, the speed of travelling of the vehicle. The digital display device 364 is of a dynamic drive type employing 7-segment digit indicator tubes to exclusively show, on six figures, the total distance travelled by the vehicle. The digital display device 366 is of a dynamic drive type employing 7-segment digit indicator tubes to alternatively show, on six figures, vehicle travel distance, desired time, desired radio channel, fuel consumption, and the like, and an individual unit indicator.

The auxiliary control unit 300 is connected to the main control unit 100 through the connected 302 for transferring data therebetween. When the ignition switch 84 is turned on, initial settings are made for the main and auxiliary control units.

The auxiliary control unit 300 receives sensor signals from various sensors positioned at various locations with respect to the engine and vehicle, data signals from the main control unit 100, and command signals from the keyboard input device 350, and performs various functions as follows:

(1) It acts as a speed meter. It measures the distance traveled by the vehicle for a unit time and displays the measured distance on the digital display device 362.

(2) It acts as an odometer. It measures the total distance traveled by the vehicle since the vehicle was completed and displays the measured total distance on the digital display device 364.

(3) It acts as a trip meter. It counts pulses from the travel distance sensor 332 to measure the actual distance traveled by the vehicle on a trip since a clear key on the keyboard input device 350 was depressed, and display the measured distance on the digital display device 366.

(4) It acts as a tachometer. It measures the number of rotation of the engine for a unit time and displays the measured value on the digital display device 366.

(5) It acts as a navigation meter. When it receives a command signal indicative of data including a desired average vehicle speed Vs from the keyboard input device 350, it measures the actual distance D and elapsed time T, calculates the actual average vehicle speed (D/T), the difference (D/Vs−T) between the desired time D/Vs and the actual time T, and the difference (D−Vs/T) between the actual distance D and the desired distance Vs/T), and displays these differences alternatively on the digital display device 366.

(6) It acts as a radio program selector. When it receives from the keyboard input device 350 a command signal indicative of data including a desired radio channel and the time at which the desired radio program starts, it stores the data into the RAM 314. It compares the stored time with the time given by the clock 330. At the desired time, it generates a control signal to cause the radio control device 340 to select the stored radio channel. The desired radio channel and time are alternatively displayed on the digital display device 366.

(7) It acts a clock alarm. When it receives from the keyboard input devivce 350 a command signal indicative of data including a desired time at which the alarm buzzer 342 sounds, it stores the data into the RAM 314. It compares the stored time with the time given by the clock 330. At the desired time, it generates a control signal to the alarm buzzer 342 which thereby sounds. The desired time is displayed on the digital display device 366.

(8) It acts as a fuel consumption meter. It measures the quantity of fuel consumed after the clear key on the keyboard input device 350 is depressed and displays the measured fuel consumption on the digital display device 366.

(9) It acts as a fuel consumption rate meter. It measures the actual distance traveled by the vehicle for a predetermined time, divides the measured fuel consumption by the measured actual distance, and displays the quotient obtained as a result of this division on the digital display device 366.

(10) It acts as a meter indicating the distance possible for the vehicle to travel with the residual fuel. It measures the quantity of residual fuel in the fuel tank, multiplies the measured residual fuel quantity by the quotient obtained in Function (9), and displays the products obtained as a result of this multiplication on the digital display device 366.

(11) It acts as a memory for storing and displaying a desired numeral and also as an electronic table calculator for performing the arithmetic calculations of addition, subtraction, multiplication, and division on binary numbers.

Figure 4:
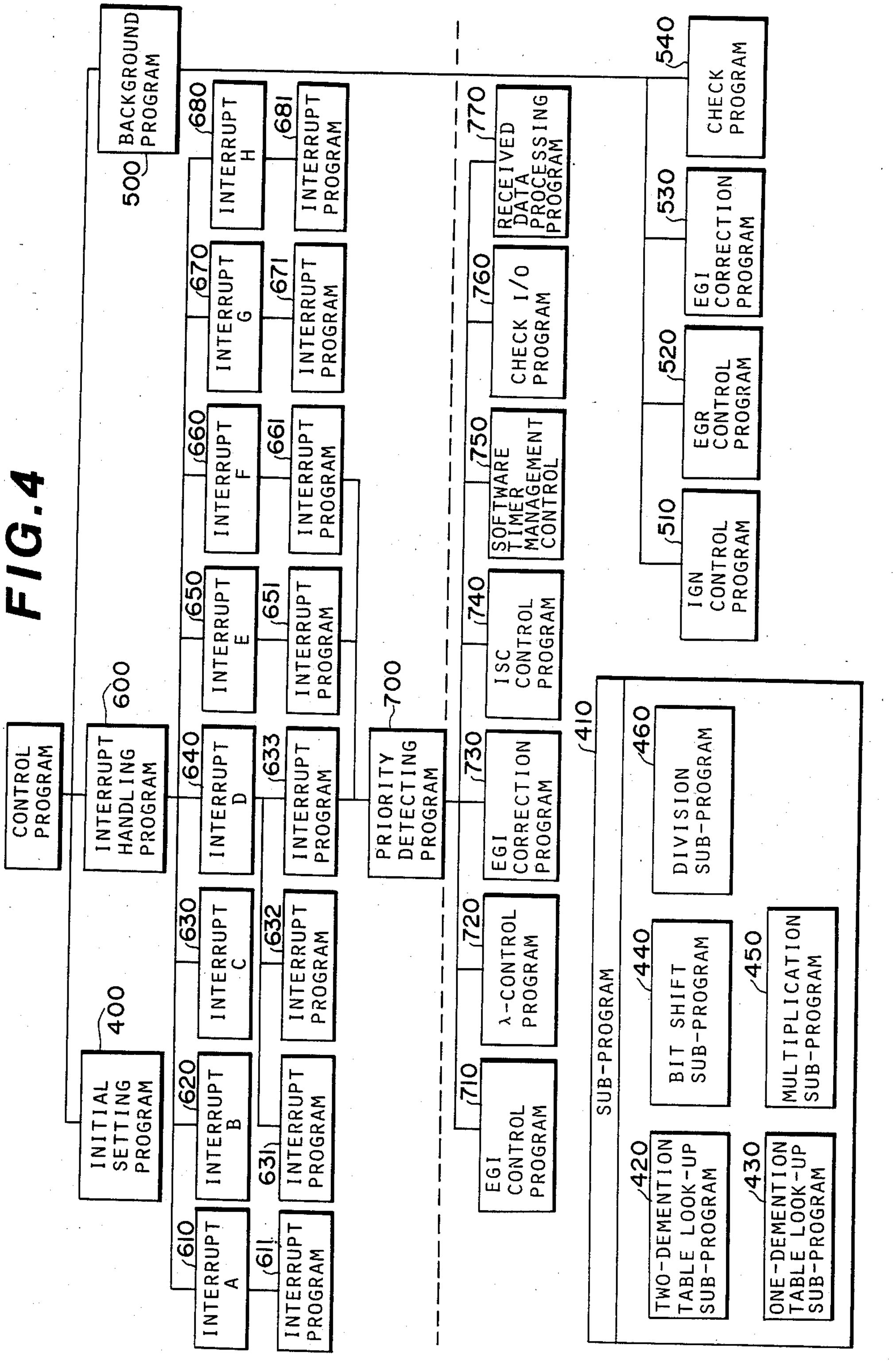
FIG. 4 is a diagram showing various programs to be executed by the digital computer included in the main control unit.

FIG. 4 illustrates various programs to be executed by the main control unit digital computer illustrated in FIG. 3 to perform the required functions. When the ignition switch 84 is turned on, the digital computer initiates first an initial setting program 400. At the end of execution of the initial setting program 400, the digital computer initiates a background program 500 which includes an ignition-timing control program 510, an EGR control program 520, a fuel-injection control program 530, and a check program 540, all of which are executed in a predetermined order. The digital computer may execute a sub-program indicated by block 410 if necessary.

If an interrupt occurs for any of various reasons during the execution of the background program or the sub-program, the digital computer initiates an interrupt handling program 600 for handling various interrupts A to H according to the type of interrupt. Block 610 indicates an interrupt A which occurs at the termination of measurement of engine speed to initiate an interrupt program 611 for determining the engine speed causing engine stall. Block 620 indicates an interrupt B which occurs upon the reception of an external signal. Block 630 indicates an interrupt C which occurs upon the occurrence of an overflow. Block 640 indicates an interrupt D which occurs at uniform time intervals; that is, upon the occurrence of pulses at the output of the clock oscillator to initiate an interrupt program 631 for outputting clock pulses, an interrupt program 632 for initiating the A to D conversion process, and an interrupt program 633 for setting a reservation flag for processing time synchronized routines. Block 650 indicates an interrupt E which occurs at a predetermined number of degrees of rotation of the engine crankshaft to initiate an interrupt program 651 for setting a reservation flag for processing crankshaft-rotation synchronized routines. Block 660 indicates an interrupt F which occurs when the main control unit 100 receives data from the auxiliary control unit 300 to initiate an interrupt program 661 for setting a reservation flag for processing the received data. Block 670 indicates an interrupt G which occurs at the end of the A to D conversion process to initiate an interrupt program 671 for storing converted digital values. Block 680 indicates an interrupt H which occurs upon the occurrence of an instruction having the highest priority level to initiate an interrupt program 681 for holding data in the data holding memory when the ignition switch is turned off. At the end of execution of the interrupt programs 633, 651 and 661, a program 700 is initiated for handling a EGR control program 710, a $\lambda$-control program 720, an EGI correction program 730, and ISC control program 740, a software timer management program 750, a check input/output program 760, and a received data processing program 770 according to the priority level of interrupt.

The received data processing program 770 will be further described in greater detail. The data transferred from the auxiliary control unit 300 into the main control unit 100 includes function data (F.DATA), address data (A.DATA), and numeral data (N.DATA). The function data specifies the kind of the function required to be performed and the data transfer pattern. The address data specifies the address at which the data to be used in carrying out the specified function is stored. The numeral data specifies a numeral which is used to correct the data stored in the address specified by the address data. According to the content of the function data, the main control unit 10 performs a function of (1) correcting data such as coefficients used in calculation settings for the controlled variables such as injection pulsewidth, spark ignition timing, ACC valve position, EGR valve position, and the like, (2) acquiring data necessary for calculations of settings for the controlled variables from the auxiliary control unit 300 in the event of failure of the circuit associated with the sensors, (3) transferring data demanded by the auxiliary control unit 300, or (4) checking the operation of the main control unit 100 in accordance with data transferred from the auxiliary control unit 300.

The transfer pattern of the data transferred from the auxiliary control unit 300 to the main control unit 100 is assumed as follows: The most and second most significant bits of the 8-bit function data are set at 00 if the function data, address data, and numeral data are successively transferred in this order, at 01 if the function data and address data are successively transferred in this order, at 10 if the function data and numeral data are successively transferred in this order, and at 11 if only the function data is transferred.

Figure 5:
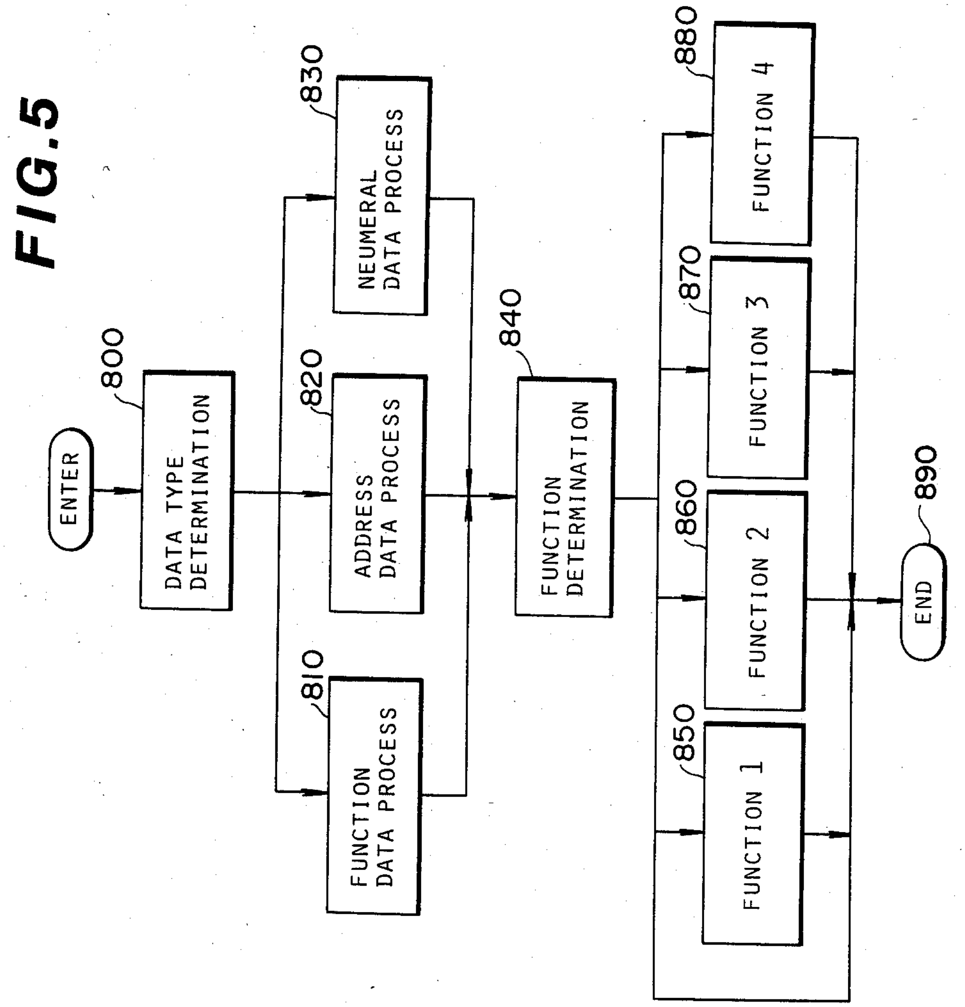
FIG. 5 is an overall flow diagram of programming of the digital computer as it is used to process the data transferred from the auxiliary control unit to the main control unit.

FIG. 5 is an overall flow diagram of programming of the digital computer as it is used to process the data transferred from the auxiliary control unit 300 to the main control unit 100. At the point 800 of the received data processing program 770, the type of the received data is determined. If the received data is function data, the digital computer executes a program for processing the function data at the point 810. If the data is address data, the digital computer executes a program for processing the address data at the point 820. If the data is a numeral data, the digital computer executes a program for processing the numeral data at the point 830. After the execution of the program at the point 810, 820 or 830, the program proceeds to a step at the point 840 wherein the content of the function data is determined. According to the content of the function data, the digital computer performs function (1) at the point 850, function (2) at the point 860, function (3) at the point 870 or function (4) at the point 880, or the program proceeds directly to the end point 890 with no function being performed.

Figure 6:
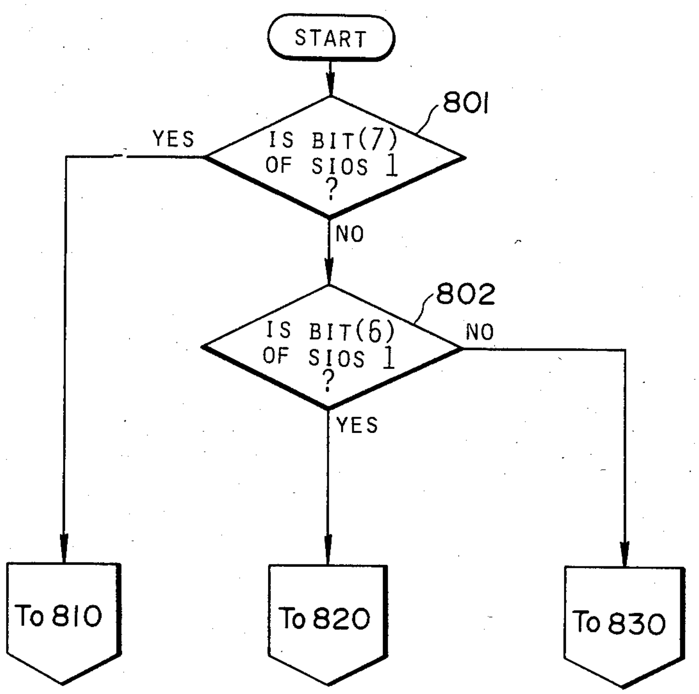
FIG. 6 is a flow diagram for the digital computer as programmed for the determination of the type of the data transferred from the auxiliary control unit to the main control unit.

FIG. 6 is a flow diagram illustrating the above determination of the type of the received data at the point 800 of FIG. 5. The data SIOS is 8-bit data for a predetermined address of the data holding memory (DHM) 124 and gives a representation of the type of the received data. As will be described in detail, the most and second most significant bits of the data SIOS is 10 at the termination of data transfer. Therefore, the received data may be determined as function data if the most and second most significant bits of the data SIOS is 01 or 00 if the received data is address data or numeral data.

At the point 801 of the program, a determination is made as to whether or not the bit (7) of the data SIOS is 1. If the answer to this question is "yes", then the program proceeds to the function data processing step at the point 810 (FIG. 5). Otherwise, at the point 802, another determination is made as to whether or not the bit (6) of the data SIOS is 1. If the answer to this question is "yes", then the program proceeds to the address data processing step at the point 820 (FIG. 5). If the answer to this question is "no", then the program proceeds to the numeral data processing step at the point 830 (FIG. 5).

Figure 7:
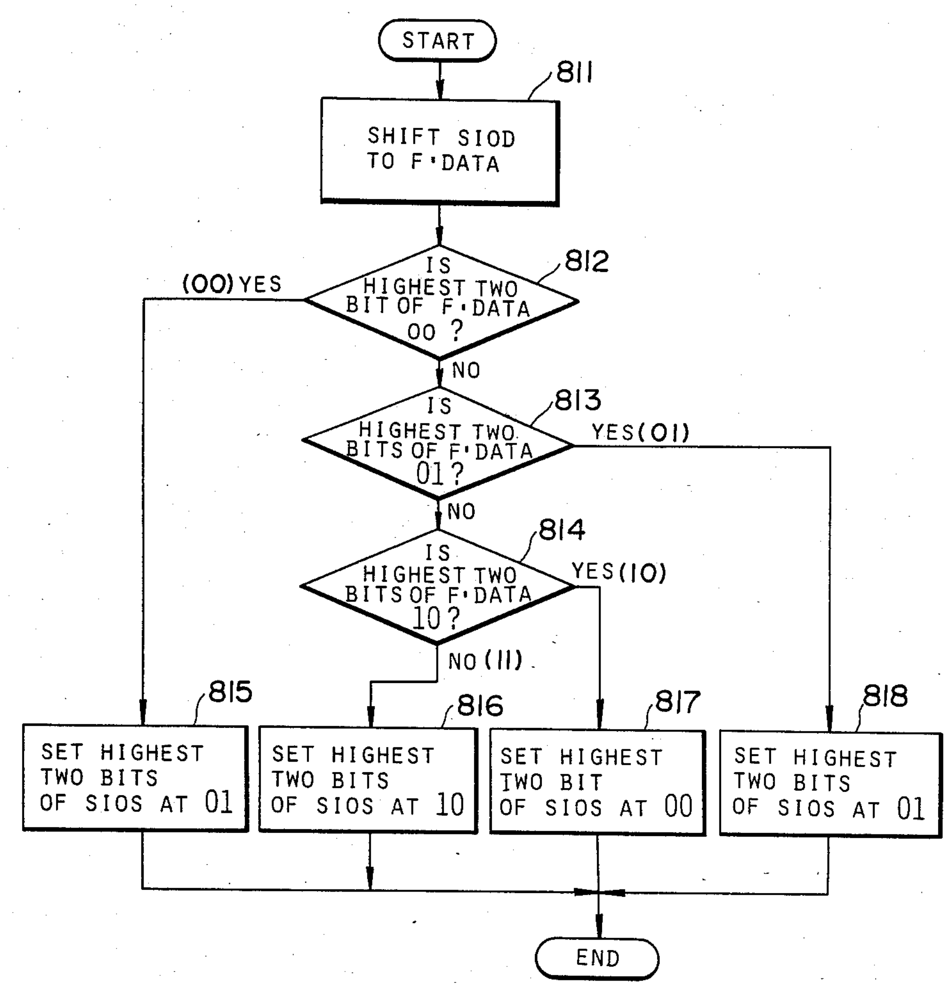
FIG. 7 is a flow diagram for the digital computer as programmed for the processing of the function data.

FIG. 7 is a flow diagram illustrating the function data processing step at the point 810 of FIG. 5. At the point 811 of the program, the data SIOD is stored in the data holding memory (DHM) 124 at an F.DATA address; that is, the data SIOD is shifted to F.DATA. The following steps at the points 812, 813 and 814 serve to determine the type of data succeeding the received F.DATA. At the point 812, a determination is made as to whether or not the most and second most significant (highest two) bits of the F.DATA is 00. If the answer to this question is "yes", then the program proceeds to the point 815 which specifies that the most and second most significant bits of the data SIOS are set at 01. The reason for this is that the data following the F.DATA will be A.DATA when the most and second most significant bits of the F.DATA is 00. If the answer to this question is "no", then at the point 813, another determination is made as to whether or not the most and second most significant bits of the F.DATA is 01. If the answer to this question is "yes", then the program proceeds to the point 818 where the most and second most significant bits of the data SIOS set at 01 since the A.DATA wll follow the F.DATA when the most and second most significant bits of the F.DATA is 01. If the answer to this question is "no", then the program proceeds to another determination step at the point 814. The determination at the point 814 is whether or not the most significant bit of the F.DATA is 10. If the answer to this question is "yes", the program proceeds to the point 817 where the most and second most significant bits of the data SIOS are set at 00 since the N.DATA will follow the F.DATA when the most and second most significant bits of the F.DATA is 10. If the answer to this question is "no", then the program proceeds to the point 816 where the most and second most significant bits of the data SIOS are set at 10 since no data will follow the F.DATA and the data transfer is completed when the most and second most significant bits of the F.DATA are 11.

Figure 8:
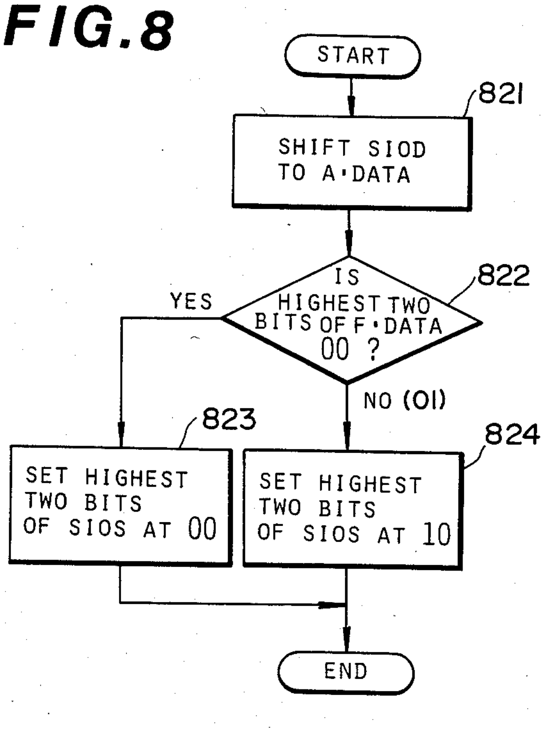
FIG. 8 is a flow diagram for the digital computer as programmed for the processing of the address data.

FIG. 8 is a flow diagram illustrating the address data processing step at the point 820 of FIG. 5. The A.-DATA is not received except when the most and second most significant (highest two) bits of the F.DATA are 00 or 01. At the step 821 of the program, the data SIOD is stored in the data holding memory (DHM) 124 at an A.DATA address; that is, the data SIOD is shifted to A.DATA. At the following point 822, a determination is made as to whether or not the most and second most significant bits of the F.DATA is 00. If the answer to this question is "yes", which specifies that the data following the A.DATA is N.DATA, the program proceeds to the point 823 wherein the most and second most significant bits of the data SIOS are set at 00. If the answer to this question is "no", which specifies that the data transfer is completed, the program proceeds to the point 824 where the most and second most significant bits of the data SIOS are set at 10.

Figure 9:
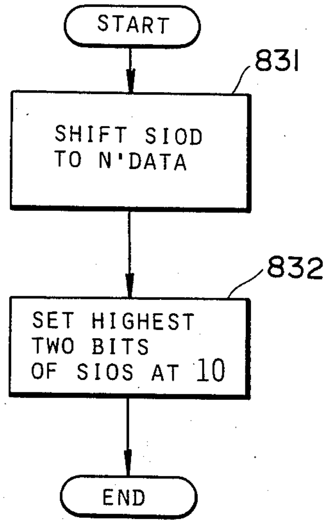
FIG. 9 is a flow diagram for the digital computer as programmed for the processing of the numeral data.

FIG. 9 is a flow diagram illustrating the numeral data processing step at the point 830 of FIG. 5. At the point 831 of the program, the data SIOD is stored in the data holding memory (DHM) 124 at a location addressed by the N.DATA; that is, the data SIOD is shifted to N.DATA. At the following point 832, the most and second most significant (highest two) bits of the SIOS are set at 10 since the data transfer is completed.

Figure 10:
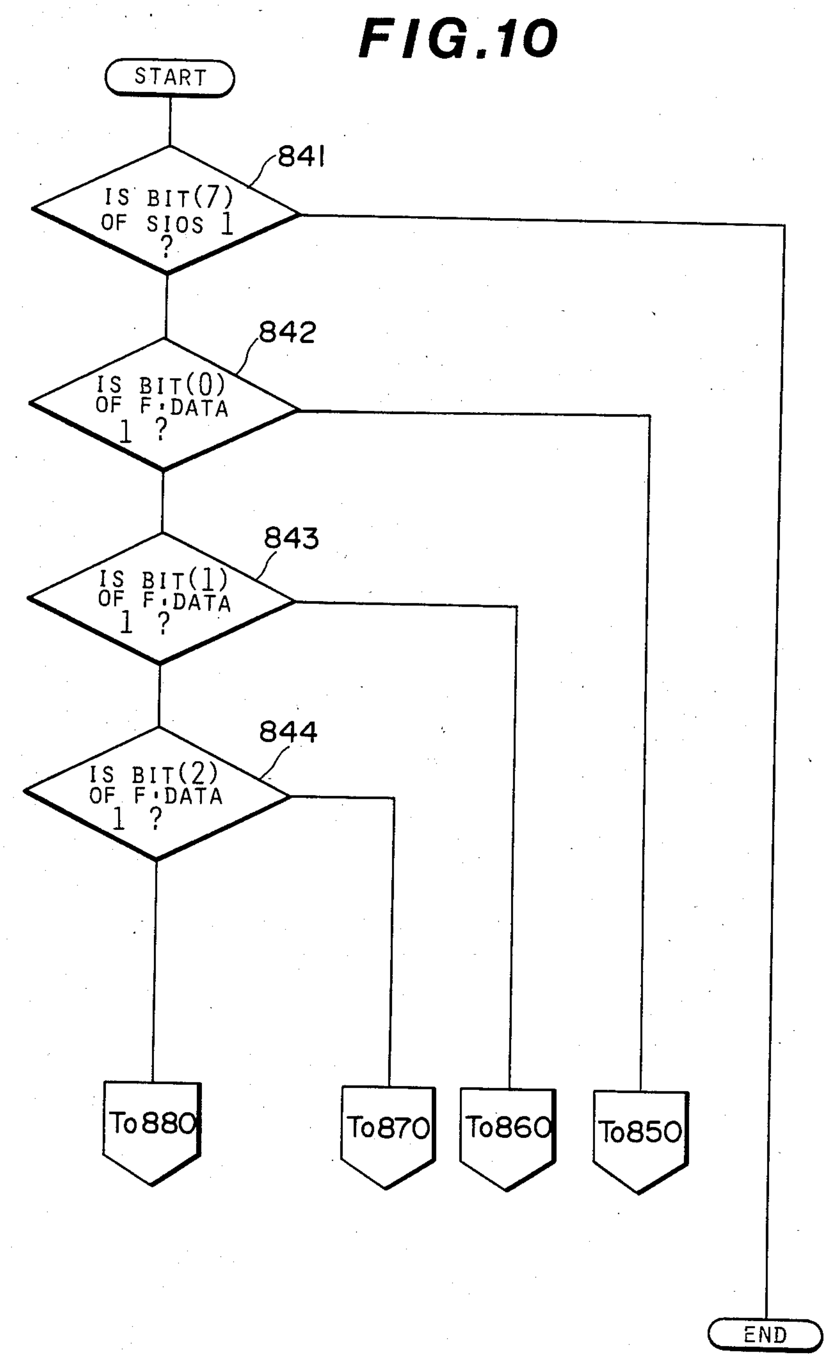
FIG. 10 is a flow diagram for the digital computer as programmed for the determination of the content of the function data.

FIG. 10 is a flow diagram illustrating the determination of the content of the received function data (F.DATA) at the point 840 of FIG. 5. The least and second, third and fourth least (lowest four) bits of the F.DATA are used to determine the content of the received F.DATA. At the step 841 of the program, a determination is made as to whether the bit (7) (the most significant bit) of the data SIOS is 1. It is noted that the most and second most significant bits of the data SIOS are 10 when the data transfer is completed and 01 or 00 when the data transfer is not completed. If the most significant bit of the data SIOS is 0, then the program proceeds to the end point for waiting the following A.DATA or A.DATA and N.DATA. If the most significant bit of the data SIOS is 1, then at the point 842, another determination is made as to whether or not the bit (0) (the least significant bit) of the F.DATA is 1. If the answer to this question is "yes", then the program proceeds to the point 850 of FIG. 5 where the digital computer performs function (1) of correcting data such as coefficients used in calculating settings for the controlled variables. It the answer to this question is "no", then the program proceeds to a determination step at the point 843. The determination at the point 843 is whether or not the bit (1) of the F.DATA is 1. If the answer to this question is "yes", then the program proceeds to the point 860 of FIG. 5 where the digital computer performs function (2) of fetching data necessary for calculations of settings for the controlled variables from the auxiliary control unit 300. If the answer to this question is "no", then the program proceeds to a determination step at the point 844. The determination at the point 844 is whether or not the bit (2) of the F.DATA is 1. If the answer to this question is "yes", then the program proceeds to the point 870 of FIG. 5 where the digital computer performs function (3) of transferring data demanded by the auxiliary control unit 300. If the answer to this question is "no", the program proceeds to the point 880 of FIG. 5 where the digital computer performs function (4) of checking the operation of the main control unit 100 in accordance with data transferred from the auxiliary control unit 300.

For example, to correct the constant used in calculating the controlled variable fuel-injection pulse-width, the keyboard input device 350 may be operated to input, into the main control unit 100, F.DATA directed to function (1), A.DATA directed to the constant for the fuel-injection pulse-width, and N.DATA directed to the value to which the constant is corrected or modified.

Figure 11:
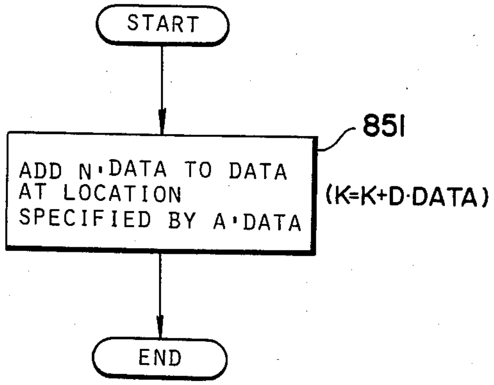
FIG. 11 is a flow diagram for the digital computer as programmed for the correction of the data stored in the computer memory.

FIG. 11 is a flow diagram illustrating the programming of the digital computer as it received F.DATA having a bit pattern of 00000001, A.DATA having a bit patter of 10000001, and N.DATA having a bit pattern of 00001100 and performs function (1). At the point 851 of the program, the N.DATA is added to the data stored at the address of the DHM 124 specified by the A.DATA. That is, $OA_H$ (=10) is added to the constant K for calculations of the controlled variable fuel-injection pulse-width at the $\mathbf{81}_H$ address since the A.DATA has a bit pattern of 10000001 corresponding to $\mathbf{81}_H$ in hexadecimal notation. Assuming that the value of the constant K is $C8_H$ (=200), it is corrected to $D2_H$ (=210). That is, this correction results in a 5% increase of the constant K.

Figure 12:
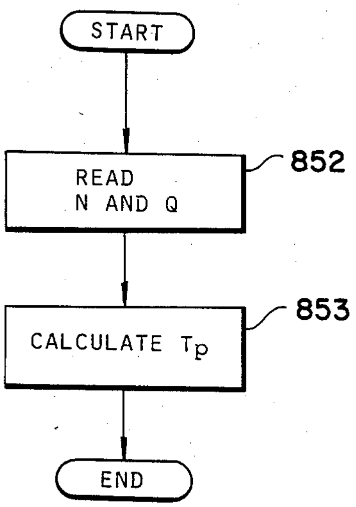
FIG. 12 is a flow diagram for the digital computer as programmed for the calculation of the basic value of the fuel-injection pulse-width.

FIG. 12 is a flow diagram illustrating the programming of the digital computer for calculating a basic value for the controlled variable fuel-injection pulse-width. At the point 852 of the program, the digital computer reads data of the speed N of rotation of the engine and the quantity Q of air to the engine into the computer memory. At the following point 853, a basic value Tp is calculated by dividing the intake air quantity Q by the engine speed N, and multiplying the quotient obtained as a result of this division by the constant K. Since the constant K is stored in the data hold memory (DHM) 124, it can be used for calculations of the fuel-injection pulse-width when the ignition switch is turned on after the engine comes to a stop.

Similar processes may be performed to modify or correct other correction factors or coefficients which are used as well as the constant K in calculating the controlled-variable fuel-injection pulse-width. In addition, the main control unit may be designed to respond to a signal from the throttle-valve switch 74 for selecting a constant which is used in calculating the controlled variable fuel-injection pulse-width only when the engine is idling.

Other coefficients or factors such as those for idle engine speed control, ignition timing control, EGR control, and the like can be modified or corrected by suitably selecting the address of the input data (which is specified by the A.DATA) and the correction value (which is specified by the N.DATA).

Correction values are stored in the data holding memory (DHM) 124 which hold the stored data independently of the ignition switch being turned off. The DHM 124 may be constructed by a nonvolatile memory which can hold the stored data after the memory is disconnected from a power source, although such a nonvolatile memory is very expensive.

While the present invention has been described in connection with a four cycle, six cylinder engine, it should be understood that the invention contemplates use with engines of any design. In addition, while the present invention has been described in connection with a specific embodiment thereof, it is evident that many alternatives, modifications and variations will be apparent to those skilled in the art. Accordingly, it is intended to embrace all alternatives, modifications, and variations that fall within the spirit and broad scope of the appended claims.

What is claimed is:

1. An apparatus for controlling the energy conversion process of an internal combustion engine, comprising:

means for controlling the energy conversion process;

sources for providing signals indicative of engine operating parameters;

a data input unit having a keyboard input device for providing data specifying a function to be performed, a memory location, and a numeral; and a digital computer having a memory for storing coefficients in respective locations, the digital computer using the signals from the sources and the coefficients stored in the memory for calculating settings of the means for controlling the energy conversion process, the digital computer being connected to receive said data from the data input unit and being programmed to perform said specified function using said specified numeral and said specified memory location, said specified function including modifying a coefficient stored in the memory at the specified location based upon the specified numeral.

2. The engine control apparatus as claimed in claim 1, wherein the digital computer includes means for connecting the coefficient by adding the specified numeral to the value stored in the memory at the specified location.

3. The engine control apparatus as claimed in claim 1, wherein the engine includes a source of potential for supplying a potential to the memory independently of an ignition switch being turned off.

* * * * *